April 8, 1952 E. O. HOLLAND ET AL 2,591,816
TELEVISION TEST SIGNAL GENERATOR
Filed Aug. 30, 1949
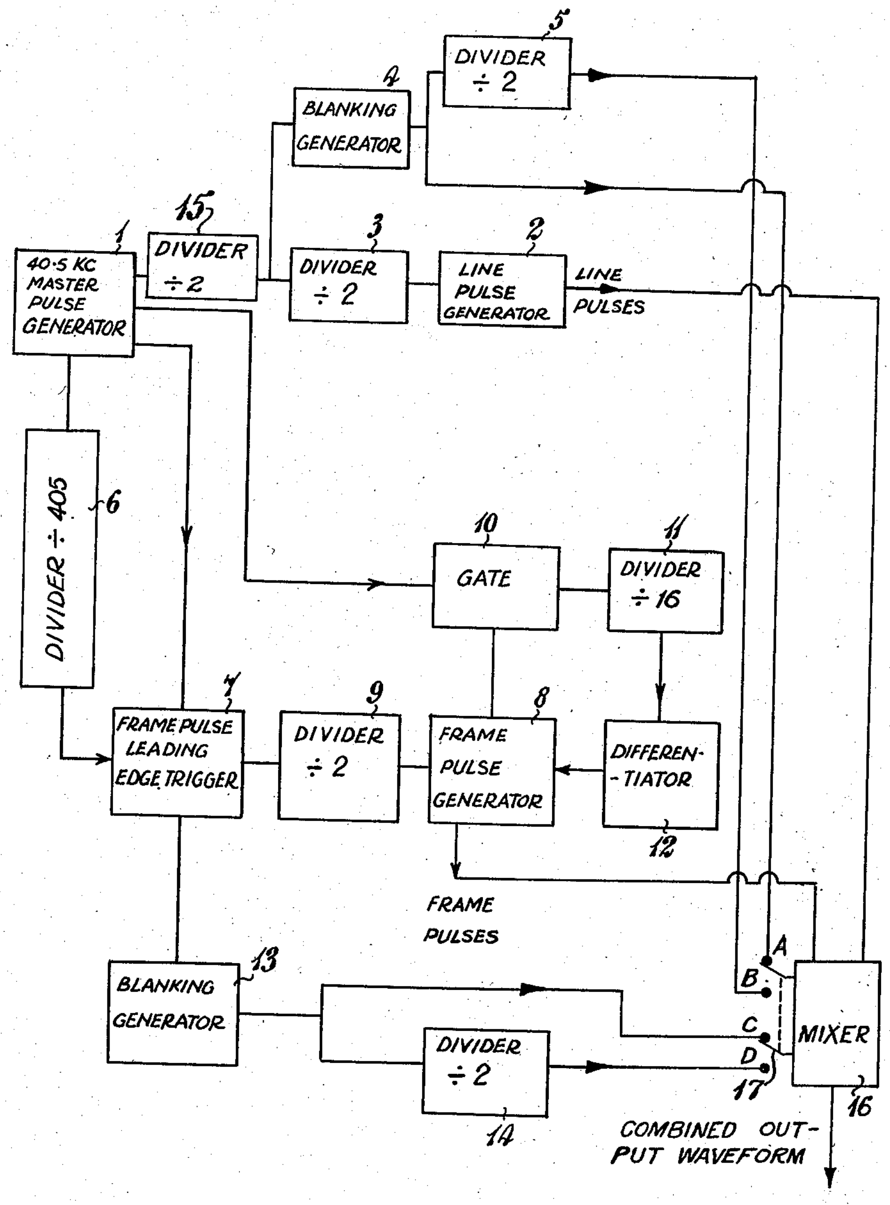
INVENTORS
Ernest Oliver Holland
James Boyd Smith
BY
Blair + Black
ATTORNEYS Patented Apr. 8, 1952 2,591,816

UNITED STATES PATENT OFFICE 2,591,816

TELEVISION TEST SIGNAL GENERATOR

Ernest Oliver Holland and James Boyd Smith, Cambridge, England, assignors to Pye Limited, Cambridge, England, a British company Application August 30, 1949, Serial No. 113,127
In Great Britain August 31, 1948

4 Claims. (Cl. 250—36)

The present invention relates to a circuit arrangement for producing the cross device used as a television test signal. To this end, according to the invention, means are provided for producing blanking pulses at a multiple of the line repetition frequency and a multiple of the frame repetition frequency, whilst triggering the line and frame time bases at the standard predetermined frequency. In this manner, if the blanking frequencies are twice the line and frame repetition frequencies, a pattern is produced on the television raster comprising a vertical line and a horizontal line corresponding to the double frequency blanking pulses, the width of the lines depending upon the width of the blanking pulses.

To enable the cross device signal to be produced with an existing television waveform generator or, for example, with the television waveform generator as described in the specification of our copending application Serial No. 113,126 of Ernest Oliver Holland and James Boyd Smith filed August 30, 1949, it is only necessary to double the frequency of the waveform originating pulses or oscillations and to divide this frequency by two, for example by a binary counter, to produce pulses of the correct frequency for producing the standard television waveform. The double frequency is used for producing double frequency line and frame blanking pulses when the test signal cross is to be transmitted.

Thus, for example, in applying this invention to a television waveform generator as described in the specification of copending application Serial No. 113,126 of Ernest Oliver Holland and James Boyd Smith filed Aug. 30, 1949, the originating pulse generator operates at 40.5 kc., instead of 20.25 kc., these 40.5 kc. pulses being used for generating the blanking pulses to produce the vertical line of the cross pattern. The pulse frequency would be divided by four to produce the line synchronising pulses and the output from the frame synchronising leading edge trigger would be divided by two in its passage to trigger the frame pulse generator. The frame blanking generator would be triggered from the leading edge trigger device, one part of the output thereof being used to produce the blanking pulses for the horizontal line of the cross pattern, and another part, after division by two, being used to produce the normal frame blanking pulses of the television waveform. The double frequency line and frame blanking pulses would be impressed upon the transmitted waveform when the test cross has to be transmitted.

The various dividing devices may comprise binary electronic counters which may be constructed as described, for example, in copending application Serial No. 113,125 of Ernest Oliver Holland filed August 30, 1949.

As the line and frame blanking pulses are derived from the line and frame cross signals, the test signal is accurately positioned in the line and frame blanking period and provides a check for linearity.

In order that this invention may be more fully understood one embodiment will now be described with reference to the accompanying drawing, which is a block diagram of a circuit arrangement designed for use with apparatus operated in accordance with the British television standards, namely 405 lines with interlaced scanning at 25 frames per second.

Referring to the drawing a master pulse generator 1 operates at a frequency of 40.5 kilocycles and this feeds a line pulse generator 2 through the divider 15 and the divider 3 which each divide by 2, so that the line pulse generator generates line pulses at the line repetition frequency. A blanking generator 4 is also fed through the divider 15 from the master pulse generator 1 and this generates blanking signals having a repetition frequency equal to twice the line repetition frequency. The output from the blanking generator 4 can be used either directly or through a divider stage 5.

Pulses from the master pulse generator 1 are also fed to a divider 6 which, in the case of the British television standards, may be arranged to effect a division by 405 in order to produce output pulses at twice the frame pulse repetition frequency. These output pulses from the divider 6 are fed to the frame pulse leading edge trigger 7 which comprises a resistance-coupled multivibrator circuit as described in co-pending application Serial No. 113,125 of Ernest Oliver Holland filed August 30, 1949, but arranged for asymmetric operation. The output pulses from the divider 6 are fed as negative pulses to the anode of one of the two valves of the circuit, master pulses from the master pulse generator 1 being fed as negative pulses to the anode of the other valve. Thus the frame pulse leading edge trigger 7 is normally held with one of these valves conducting by reason of the application thereto of a series of master pulses from the generator 1. Upon a pulse being fed to the anode of the other valve from the output of the divider 6, however, the multivibrator changes over to render the second valve conducting, being shortly thereafter triggered back to its normal position by the application of the next succeeding pulse of the master pulse train. This changeover produces a short pulse in the output circuit of the second valve, which output pulse is fed to the frame pulse generator 8 through a divider 9 so that the frame pulse generator 8 is triggered by the trailing edge of the alternate output pulses from the frame pulse leading edge trigger 7. Thus the frame pulse generator 8 is always triggered in correct time relation with the line synchronising pulses by alternate pulses from the master pulse generator 1 which immediately follow the output pulse from the divider 6. Due to the fact that the frame pulse leading edge trigger 7 has been restored by the master pulse to its normal condition, no further pulse is fed to trigger the frame pulse generator 8 from the divider 9 until after another 810 master pulses.

Pulses of the master generator 1 are also fed to a gate valve 10 having its grid normally biased so that it is non-conducting. The starting of the frame pulse generator 8, however, opens the gate valve 10 to allow the master pulses to pass therethrough to a divider 11 comprising a plurality of series-connected binary counters to effect division by the number of pulses corresponding to the time duration of a frame pulse. In the British system this corresponds to sixteen of the master pulses and, therefore, the divider 11 effects a division by 16. The sixteenth pulse produces an output pulse from the divider 11 which after differentiation by a differentiator 12 is fed back as a negative pulse to cut off the frame pulse generator 8 thereby determining the length of the frame pulse. Upon the frame pulse generator 8 being cut off, the gate valve 10 is simultaneously closed so that no further pulses from the master pulse generator 1 are fed to the divider 11 until the frame pulse generator 8 is again triggered by the next succeeding pulse from the divider 6.

The frame pulse generator 8 also preferably comprises an asymmetric multivator circuit as described in the aforementioned co-pending application, each alternate negative pulse from the frame pulse leading edge trigger 7 fed through the divider 9 switching over the multivibrator to initiate the production of the frame pulse, and the negative pulse fed from the output from the differentiator 12 reversing the circuit of the frame pulse generator so that generation of the frame pulse is stopped.

The output from the frame pulse leading edge trigger 7 is also fed to a blanking generator 13 which is arranged to produce blanking signals of twice the frame pulse repetition frequency. These blanking signals are utilised to provide the cross device pattern of the television test signal. The output from the blanking generator 13 is also fed through a divider 14 from which blanking signals at the frame repetition frequency are obtained for normal operation of the apparatus.

The line and frame synchronising pulses and either the blanking pulses at line and frame frequency, or the blanking pulses at twice the line and frame frequency, are mixed in the mixer circuit 16, to produce either the combined waveform necessary to normal operation, or the combined waveform which will produce the cross-pattern of the television test signal.

When it is desired to generate the cross device pattern as a test signal the mixer 16 is fed from the blanking generator 4 via the lead A and one pole of the changeover switch 17 to provide blanking signals at twice the line repetition frequency and the line pulses are fed to the mixer 16 from the line pulse generator 2. Frame pulses are simultaneously fed to the mixer 16 from the frame pulse generator 8 and other blanking signals at twice the frame repetition frequency from the blanking generator 13 via the lead C and the second pole of the changeover switch. The effect of these blanking signals is to produce a black cross on the screen of the television apparatus the width of the limbs being dependent upon the duration of the blanking signals.

For normal operation the changeover switch 17 is moved to its other position and blanking signals are fed to the mixer 16 via the lead B and one pole of the changeover switch from the divider 5 and via the lead D and the other pole of the changeover switch from the divider 14, these blanking signals recurring at the line pulse and frame pulse repetition frequencies respectively. Line and frame pulses are also fed to the mixer 16 from the line pulse generator 2 and the frame pulse generator 8.

Whilst a particular embodiment has been described, it will be understood that various modifications may be made without departing from the scope of the invention as defined in the appended claims. For example instead of operating the master pulse generator 1 at four times the line repetition frequency it may be operated at any convenient multiple and the blanking generators 4 and 13 may be arranged to generate blanking signals at any desired multiple of the line and frame repetition frequencies. If the repetition frequencies of these blanking signals is three or any larger integral number of times the line and frame repetition frequencies then the test signal will, instead of being a cross, be in the form of a lattice.

We claim:

1. A television waveform generator, comprising a master pulse generator for generating a train of master pulses, means for generating a train of line synchronising pulses from said master pulses, means for generating a train of frame synchronising pulses from said master pulses, a first blanking generator for generating blanking pulses from said master pulses at an integral multiple greater than unity of the line repetition frequency, a first divider connected to said first blanking generator for producing blanking pulses at the line repetition frequency, a second blanking generator for generating blanking pulses from said master pulses at an integral multiple greater than unity of the frame repetition frequency, a second divider connected to said second blanking generator for producing blanking pulses at the frame repetition frequency, and means for selectively mixing either said line and frame synchronising pulses and the outputs from said first and second dividers, or said line and frame synchronising pulses and the outputs from said first and second blanking generators.

2. A television waveform generator, comprising a master pulse generator for generating a train of master pulses, means for generating a train of line synchronising pulses in timed relation with said master pulses, means for generating a train of frame synchronising pulses in timed relation with said master pulses, a first blanking generator for generating blanking pulses in timed relation with said master pulses, at an integral multiple greater than unity of the line repetition frequency, a first divider connected to said first blanking generator for producing blanking pulses at the line repetition frequency, a second blanking generator for generating blanking pulses in timed relation with said master pulses, at an integral multiple greater than unity of the frame repetition frequency, a second divider connected to said second blanking generator for producing blanking pulses at the frame repetition frequency, and means for selectively mixing either said line and frame synchronising pulses and the outputs from said first and second dividers, or said line and frame synchronising pulses and the outputs from said first and second blanking generators.

3. A television waveform generator, comprising a line pulse generator, a frame pulse generator, means for generating blanking pulses at the line repetition frequency, means for generating blanking pulses at an integral multiple greater than unity of the line repetition frequency, means for generating blanking pulses at the frame repetition frequency, means for generating blanking pulses at an integral multiple greater than unity of the frame repetition frequency, a master pulse generator for generating a train of master pulses at a frequency which is an integral multiple of the frequencies of each of the said line frame and blanking pulse generators, means for controlling the timed relationship between the pulses generated by each of said line, frame and blanking pulse generators by said master pulses, means for selectively mixing either said line and frame synchronising pulses and the blanking pulses at line and frame frequencies, or said line and frame synchronising pulses and the blanking pulses at an integral multiple greater than unity of the line and frame synchronising pulses.

4. A television waveform generator, comprising a master pulse generator for generating a train of master pulses at an integral multiple greater than unity of the line repetition frequency, a first blanking generator connected to said master pulse generator for generating blanking pulses at an integral multiple greater than unity of the line repetition frequency, a first divider connected to said first blanking generator for generating blanking pulses at line repetition frequency, a line pulse generator connected to said master pulse generator through a second divider for generating line synchronising pulses, a second blanking generator connected to said master pulse generator through a third divider for generating blanking pulses at an integral multiple greater than unity of the frame repetition frequency, a fourth divider connected to said second blanking generator for generating blanking pulses at frame repetition frequency, a frame pulse generator connected to said third divider through a fifth divider for generating frame synchronising pulses, and means for selectively mixing either said line and frame synchronising pulses and the outputs from said first and second blanking generators, or said line and frame synchronising pulses and the outputs from said first and fourth dividers.

ERNEST OLIVER HOLLAND.
JAMES BOYD SMITH.

REFERENCES CITED

The following references are of record in the file of this patent:

UNITED STATES PATENTS

| Number | Name | Date |
|---|---|---|
| 2,274,366 | Hansen | Feb. 24, 1942 |
| 2,292,045 | Burnett | Aug. 4, 1942 |
| 2,420,516 | Bischoff | May 13, 1947 |